N. M. HOPKINS.
MAGNETO ELECTRIC GENERATOR.
APPLICATION FILED MAY 20, 1913.

1,150,520.

Patented Aug. 17, 1915.

UNITED STATES PATENT OFFICE.

NEVIL MONROE HOPKINS, OF WASHINGTON, DISTRICT OF COLUMBIA, ASSIGNOR TO THE ELECTRIC TACHOMETER COMPANY, OF PHILADELPHIA, PENNSYLVANIA, A CORPORATION OF NEW JERSEY.

MAGNETO-ELECTRIC GENERATOR.

1,150,520.  Specification of Letters Patent.  Patented Aug. 17, 1915.

Original application filed August 1, 1912, Serial No. 712,738. Divided and this application filed May 20, 1913. Serial No. 768,853.

*To all whom it may concern:*

Be it known that I, NEVIL MONROE HOPKINS, a citizen of the United States, residing at Washington, District of Columbia, have invented certain new and useful Improvements in Magneto-Electric Generators, of which the following is a specification.

This generator is especially designed for use in the tachometer constituting the subject-matter of my Patent No. 1,078,200, dated Nov. 11, 1913, of which the present case is a division.

The generator is constructed to furnish two-phase current, and comprises a permanent magnet having laminæ with integral extensions constituting pole-pieces, a winding on each pole-piece and parallel soft-iron inductors respectively opposed to the pole-pieces and angularly displaced relatively to each other. The laminæ are magnetically united in proximity to the pole-pieces by soft-iron rivets.

This construction provides for the use of the full magnetic flux of the entire laminated magnet, this full flux threading the two polar windings alternately.

Figure 1:
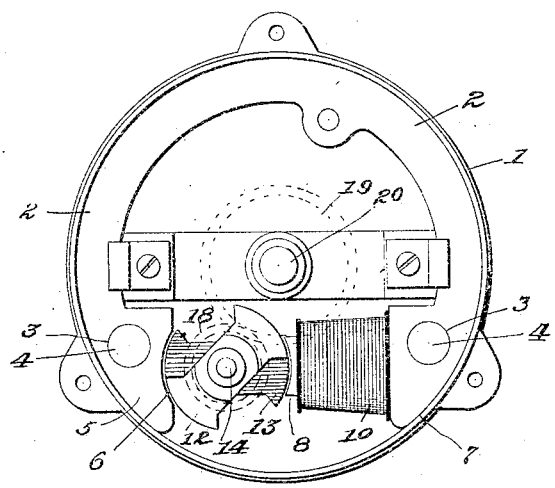
Figure 2:
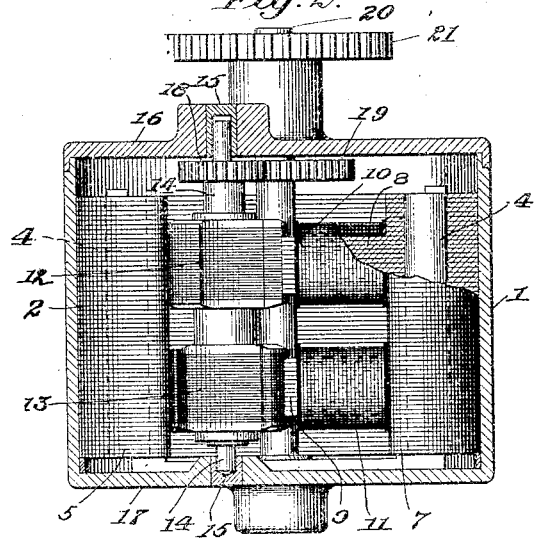

Referring to the accompanying drawing—Figure 1 is an end elevation of the generator, with the driving-pinion and one end-plate removed; and Fig. 2 is a plan view of the generator, its case being shown in section.

The generator comprises in a preferred embodiment a cylindrical water- and dust-proof case 1, within and closely fitting the side walls of which is a laminated permanent magnet 2 in the form of an interrupted annulus. The opposite ends of this magnet have large cylindrical passages 3, which receive closely-fitting soft-iron rivets 4 serving magnetically to unite the laminæ. The end 5 of the magnet constitutes one pole-piece, and has a vertical arc-shaped recess 6. The other end 7 of the magnet has two adjacent projecting taper concave-faced pole-pieces 8, 9, provided by integral extensions of the corresponding laminæ. Pole-piece 8 carries a winding 10 and pole-piece 9 carries a winding 11. The rotor of this generator consists of two parallel inductors 12, 13, of soft iron, rigidly mounted with a relative angular displacement of 45° on a central inductor shaft 14, which is journaled at its ends in bushings 15 seated in the end-plates 16, 17 of the generator casing. This shaft, being of small diameter, only slightly decreases the magnetic permeability of the inductors. Shaft 14 carries at one end a gear 18, which meshes with a gear 19 fixed on a larger shaft 20 centrally journaled in and extending through the end-plate 16. Shaft 20 carries an external pinion 21, adapted to engage a driving gear-wheel. When the inductors 12, 13 are set in rotation, two-phase current, or two alternating currents out of phase with each other by an angle of 90° electrically, are induced in the windings 10, 11, each phase winding utilizing substantially the entire flux of the magnet.

When one of the two revolving inductors, as illustrated the inductor 13, is momentarily in position to fully short-circuit the magnetic flux between the magnet pole-piece 5 and the wound pole-piece 9, the soft-iron rivets 4 transmit the flux from the other laminæ of the magnet, where the magnetic circuit is then partially interrupted by the disalinement of inductor 12, to the laminæ constituting the pole-piece 9, so that the full power of the magnet is utilized to saturate the pole-piece 9 and thereby increase the strength of the currents generated in the winding 11. As the inductors rotate farther, bringing the inductor 12 in alinement with the corresponding gap, the rivets 4 similarly transmit the flux from the more remote laminæ. One or the other of the two inductors 12, 13 at all times acts as a magnetic bridge or armature for all of the assembled laminæ, the combined flux of which is carried by the soft-iron rivets 4, magnetically uniting all of these laminæ, whereby the retention of their magnetism is insured. The inductors being journaled in internal dust-proof bearings, which are little subject to wear, may be such size as to nearly fill the gap between the magnet-poles, thereby giving a magnetic circuit of low reluctance.

I claim:—

1. An electric generator, comprising a laminated permanent magnet, having laminæ extended at adjacent points to form parallel pole-pieces integral therewith, windings on said pole-pieces, and inductors respectively opposed to said pole-pieces and angularly displaced relatively to each other.

2. An electric generator, comprising a laminated permanent magnet, having laminæ extended at adjacent points to form parallel pole-pieces integral therewith, windings on said pole-pieces, a soft-iron member magnetically uniting the laminæ which comprise said pole-pieces, and inductors respectively opposed to said pole-pieces and angularly displaced relatively to each other.

3. An electric generator, comprising a laminated permanent magnet, having laminæ extended at adjacent points to form parallel pole-pieces integral therewith, windings on said pole-pieces, soft-iron rivet magnetically uniting the laminæ which comprise said pole-pieces, and inductors respectively opposed to said pole-pieces and having an angular displacement of 45° relatively to each other.

In testimony whereof I affix my signature in presence of two witnesses.

NEVIL MONROE HOPKINS.

Witnesses:
WALTER O. BLACKWOOD,
N. P. LEONARD.

Copies of this patent may be obtained for five cents each, by addressing the "Commissioner of Patents, Washington, D. C."